(12) United States Patent
Bielmann et al.

(10) Patent No.: US 9,159,015 B2
(45) Date of Patent: Oct. 13, 2015

(54) FLEXIBLE TAG

(71) Applicant: ASSA ABLOY AB, Stockholm (CH)

(72) Inventors: Marc Bielmann, La Tour-de-Treme (CH); Jean-Miguel Robadey, Bossonnens (CH); Eric Suligoj, Epalinges (CH); Elies Ennabli, Lausanne (CH)

(73) Assignee: ASSA ABLOY AB (SE)

(*) Notice: Subject to any disclaimer, the term of this patent is extended or adjusted under 35 U.S.C. 154(b) by 0 days.

(21) Appl. No.: 13/768,138

(22) Filed: Feb. 15, 2013

(65) Prior Publication Data

US 2013/0277435 A1 Oct. 24, 2013

(30) Foreign Application Priority Data

Apr. 23, 2012 (CH) .......................... 552/12

(51) Int. Cl.
 *G06K 19/00* (2006.01)
 *G06K 19/077* (2006.01)
 *G06K 19/02* (2006.01)

(52) U.S. Cl.
 CPC ........ *G06K 19/07749* (2013.01); *G06K 19/025* (2013.01); *Y10T 29/49018* (2015.01)

(58) Field of Classification Search
 USPC .......................................... 235/487, 488, 492
 See application file for complete search history.

(56) References Cited

U.S. PATENT DOCUMENTS

| 4,342,904 A | 8/1982 | Onsager |
| 2005/0128086 A1* | 6/2005 | Brown et al. ............. 340/572.8 |
| 2009/0267225 A1 | 10/2009 | Eguchi |

FOREIGN PATENT DOCUMENTS

| DE | 102004027978 A1 | 12/2005 |
| DE | 102007022865 | 11/2008 |
| DE | 102007022865 A1 | 11/2008 |
| EP | 1863126 A1 | 12/2007 |
| EP | 2187344 A1 * | 5/2010 |
| WO | WO2005099326 A2 | 10/2005 |
| WO | WO2006000849 A1 | 1/2006 |
| WO | WO2010116935 A1 | 10/2010 |

OTHER PUBLICATIONS

Search Report prepared by the Swiss Patent Office on Jul. 10, 2012, for Swiss Patent Application No. CH00552/12.

* cited by examiner

*Primary Examiner* — Matthew Mikels
(74) *Attorney, Agent, or Firm* — Sheridan Ross P.C.

(57) ABSTRACT

A flexible Radio-Frequency IDentification (RFID) tag comprises a flexible substrate layer on which is fixed an antenna connected to a RFID chip, and a second flexible layer placed directly over the said chip and antenna but without any direct mechanical connection to them, such that the substrate layer and the second layer form a protective inlay for the chip and the antenna. The said inlay is embedded in a flexible housing.

16 Claims, 2 Drawing Sheets

FLEXIBLE TAG

CROSS-REFERENCE TO RELATED APPLICATION

This application claims the benefit of Swiss Patent Application No. CH 00552/12 filed Apr. 23, 2012, the entire disclosure of which is incorporated herein by reference.

TECHNICAL FIELD

The invention refers to a flexible RFID tag, particularly for use in harsh environments like in laundry or industrial processes.

BACKGROUND OF THE INVENTION AND PRIOR ART

RFID tags are well known in the art and generally comprise an electrical circuit having an antenna connected to an integrated circuit (RFID chip or module). The transponder is responsive to a received radio frequency signal and produces a radio frequency signal.

Beside the connection of the two electric elements of the electrical circuit, a key step of the manufacture of a transponder is the encapsulation of said electrical circuit in order to protect it from mechanical shocks, from soiling, fluids, heat, . . . to ensure a durable mechanical connection between the two elements and to provide a size that allows for better handling.

To ensure perfect functionality of the transponder, the packaging has to be totally adapted to the nature of the final application and to the specifications defined by the user. The final product can be—but is not limited to—a glass mini-tube, a plastic coin token or a contactless smart card. Due to the popularity of the RFID technology in an increasing number of fields of activity, there are more and more demands for special types of packaging.

It is therefore an object of the present invention to provide an RFID tag with a high resistance to flexion stress. Such tag would be very suitable for example for laundry applications wherein solid un-flexible bodies are not desired.

The applicant has already proposed a flexible tag for laundry application in the patent application DE102004027978. It discloses a smart laundry label wherein the transponder is maintained floating in a soft adhesive between two cover sheets. This structure ensures a very high flexibility as well as a good protection of the chip and antenna as they are freely floating in a semi-liquid material. This solution has however multiple drawbacks. The handling of large quantity of soft adhesive material is not very appropriate for high volume manufacturing (costly and dirty). The fact that the antenna and the chip are also not fixed to any support structure is also a source of weakness for example in regard of extreme bending wherein the entire efforts will directly apply to these active components (or their connection). Such a tag shows also a poor resistance to mechanical impact.

SUMMARY OF THE INVENTION

It is an aim of the present invention to improve the known products and methods.

It is further an aim of the present invention to provide a solution to increase the mechanical stress resistance of RFID antennas and chips, which are enclosed in a flexible tag.

In a first aspect the invention provides a flexible Radio-Frequency IDentification (RFID) tag comprising a flexible substrate layer on which is fixed an antenna connected to a RFID chip, and a second flexible layer placed directly over the said chip and antenna but without any direct mechanical connection to them, such that the substrate layer and the second layer form a protective inlay for the chip and the antenna. The said inlay is embedded in a flexible housing.

In a first preferred embodiment, the flexible tag is such that when the tag is bent or compressed, the chip and antenna can freely follow the deformation of the substrate layer without being submitted to mechanical stress due to differences of deformation of the second layer or of any other material forming the tag.

In a second preferred embodiment of the flexible tag, the housing comprises a rigid protection ring having a cavity in its center, and which is oriented slightly in parallel to the inlay and positioned such that the chip inside of the inlay is situated at the vertical of the said cavity.

In a third preferred embodiment of the flexible tag the second layer is fixed to the support layer at a plurality of points.

In a fourth preferred embodiment of the flexible tag the second layer is fixed to the support layer on its entire circumference such that the inlay form a sealed envelop protecting the chip and the antenna.

In a fifth preferred embodiment of the flexible tag the substrate layer and the second layer are made of polyimide.

In a sixth preferred embodiment of the flexible tag the housing is made out of one of thermoplastic elastomer, plastic rubber, thermoplastic polyurethane or silicon.

In a second aspect the invention provides a method for manufacturing a flexible Radio-Frequency IDentification (RFID) tag such as described herein above in the present section, comprising arranging and fixing an antenna connected to a RFID chip on a flexible substrate layer, covering the said chip and said antenna with a second flexible layer such that the substrate layer and the second layer form a protective inlay for the chip and the antenna, and embedding the inlay in a flexible housing.

In a seventh preferred embodiment, the step of embedding comprises forming a back side housing by a first injection of housing material, stacking the inlay in the back side housing, and completing the housing by a second injection of housing material over the back side housing and the inlay, whereby the inlay is then fully embedded in the completed housing.

In an eighth preferred embodiment, a rigid ring is positioned in the back side housing previous to stacking the inlay.

In a ninth preferred embodiment the method further comprises fixing the second layer to the substrate layer at a plurality of points before embedding the inlay in the flexible housing.

In a tenth preferred embodiment the method further comprises fixing the second layer of the support layer on its entire circumference such that the inlay forms a sealed envelop protecting the chip and the antenna before embedding the inlay in the flexible housing.

In an eleventh preferred embodiment the first layer and the second layer are of flexible material whose softening point is much higher than the process temperature to embed the inlay in the housing, such than even after the embedding, the second layer is yet not directly mechanically attached to the antenna and the chip.

DETAILED DESCRIPTION OF THE INVENTION

The invention will be better understood in light of the following description of example embodiments, and in reference to the figures. Same references will be used to designate same or similar features that appear in more than one figure.

Figure 1:
FIG. 1 illustrates an example embodiment of a flexible tag for laundry according to the invention.

Referring to FIG. 1, a flexible tag owes its flexible aspect to the material out of which it is made. This may for example be rubber that is obtained by mold injecting thermoplastic elastomer. This could in the alternative be any other flexible material such as silicone, TPU, . . . .

The flexible tag 1 typically is dimensioned to following lengths:
length=55 mm;
width=12 mm; and
thickness=2 mm.

However different dimensions may be adopted depending on the actual requirements in the use for the flexible tag 1.

Figure 2:
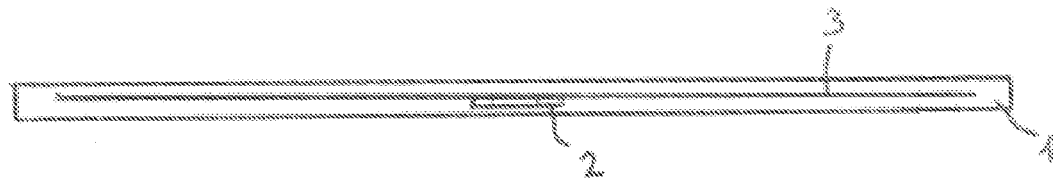
FIG. 2 illustrates a cross section of the flexible tag from FIG. 1, in a magnified scale.

FIG. 2 illustrates a cross section of the flexible tag 1 in which in addition to the material out of which the flexible tag 1 is made, a flexible RFID inlay 3 embedded in flexible tag 1's material is shown. As such the flexible tag 1 constitutes a housing for the RFID inlay 3. The terms housing and flexible tag will be used in the following in a fully interchangeable manner to designate the same feature which is referenced with the number 1 in the figures.

The RFID inlay 3 comprises an antenna coil connected to a chip (not illustrated in FIG. 2) that is part of an RFID circuit. This RFID circuit is exposed to potential cracking and breaking in case the flexible tag 1 is bent to a certain degree or compressed.

The present invention addresses the problem of potential cracking and breaking by proposing a design in which the RFID circuit, remain movable relative to at least a part of the surrounding housing 1. In other words, the RFID circuit, i.e., the or the plurality of electrically conductive components and any interconnection therein are not glued neither mechanically attached directly to the housing. Instead the RFID circuit is only attached to its support substrate which is part of the RFID inlay 3. This is explained in more detail in reference to FIG. 3.

An optional rigid ring 2 is also illustrated and will be described further on in more detail with attention to its properties and function.

Figure 3:
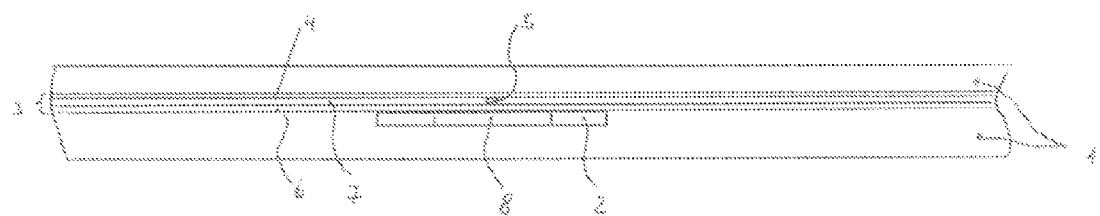
FIG. 3 illustrates a more detailed view of features shown in FIG. 2, in an even more magnified view.

FIG. 3 contains an enlarged view of the housing 1 around the RFID chip 5.

The central component of the flexible tag 1 according to the invention the RFID inlay 3 which comprises a flexible substrate layer 4 on which is fixed an antenna 7 connected to a chip 5 (see FIG. 4 for more details) and a second flexible layer 6.

The second flexible layer 6 merely covers the antenna 7 and the chip 5 without in any way being attached to these.

In order to secure the position of the second flexible layer 6 relative to the support layer 4, it may be attached thereto. Care must be taken when attaching the second layer 6 that it remains un-attached from the antenna 7 and the chip 5. This can be achieved by selecting on the support layer 4 only fixation points/portions where there is no chip 5 or antenna 7.

In a preferred embodiment, these fixation points are selected on the circumference of the substrate layer 4 or respectively the second layer 6. Ideally, the fixation could be made continuous, such that the inlay (3) forms a sealed envelope containing the chip 5 and the antenna 7.

In the structure described herein and illustrated in FIG. 3, when the flexible tag 1 is bent, the different layers forming the tag 1 are deformed according to different radius and are submitted to different deformation stresses. This radial stress differential inside of the tag 1 creates high mechanical stresses at the points where the layers are connected together. However, the antenna 7 and chip 5 are isolated of such stresses as they are mechanically connected only to the substrate layer 4, and not to the second layer 6 or any other component of the tag 1. The second layer 6 may move relatively to the antenna 7 and the chip 5, while both latter components remain attached to the first layer 4. This possibility of movement greatly reduces the risk of cracking and breaking for the components.

Figure 4:
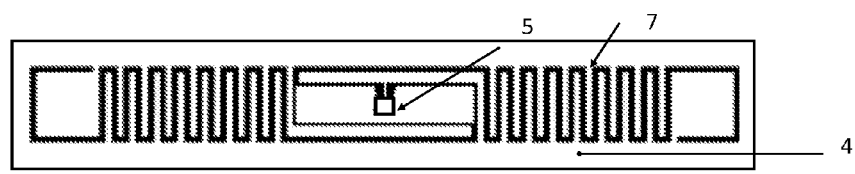
FIG. 4 shows a schematic circuitry for an example RFID circuitry for use in the invention.

FIG. 4 contains a schematic circuitry as an example RFID circuit for use in the flexible tag 1 according to the present invention. The antenna 7 and the chip 5 are shown to be arranged on the flexible substrate layer 4. In this particular example, the antenna 7 has been directly manufactured on the substrate layer 4 by any standard etched or printed process. The RFID chip 5 has then been connected to the antenna pads/ends using flip-chip process. In the present case the RFID circuit is of UHF type with a dipole antenna. But any type of RFID circuit (LF, HF, . . . ) can be used as any type of antenna (embedded wire, stamped metal foil, . . . ) or interconnection (wire bonding, SMT, . . . ).

The substrate layer 4 is preferably made out of polyimide (PI) material, which gives the layer an advantageous stability to high temperature and mechanical strains, but also an advantageous resistance and a relatively low surface adhesion. However the substrate layer 4 could also be made out of other flexible material such as for example PET.

The second layer 6 is preferably made out of the same material as the substrate layer 4, thus helps preventing any thermal mismatching as they will have the same thermal expansion. In case PI is used for both layers, the relatively low surface adhesion and the stability to high temperature helps preventing that the antenna 7 and/or the chip 5 will attach to the second layer 6 due to pressure or/and temperature (melting).

In a further preferred embodiment, the flexible tag 1 comprises the rigid ring 2 which is illustrated in FIGS. 2 and 3. The rigid ring 2 is positioned in the housing 1 in direct proximity of the inlay 3 (here beside the second layer 6). The rigid ring 2 by nature has a cavity 8, and the position of the ring 2 is chosen such that the cavity 8 covers the region of the inlay 3 where the chip 5 is positioned. In other words, the ring 2 is positioned in the housing 1 parallel to the plane defined by the inlay 3 and slightly centered at the vertical of the position of the chip 5.

The ring 2 increases the mechanical resistance in the zone of the chip 5, in particular in order to protect the connection of the chip 5 to the antenna 7. The presence of the ring allows to renounce to use usual protection means like for example epoxy potting (to hold chip and antenna together i.e. reinforcing connections).

In case of tremendous flexion of the flexible tag 1, the ring 2 will limit the possible deformation of the housing 1 in the zone around the chip 5, and such limit the bending stress in this zone.

The ring 2 offers also a strong protection against compressions or shocks. If the housing 1 is brutally compressed in the zone of the chip 5, the chip 5 will be pushed down in the cavity 8 and further compression will be constrained by the ring 2's mechanical resistance, leaving intact the chip 5 and its connections to the antenna 7.

In case the layers 4 and 6 are made out of PI, the advantageous mechanical properties at low and high temperature protect the antenna 7 against mechanical friction or electrical short cut that could potentially be created by the rigid ring 2.

The rigid ring 2 may advantageously be made out of stainless steel. However in other possible embodiments the rigid ring 2 may alternatively be made out of other rigid materials that may or may not be conductive, such as iron, metallic material, or ceramics.

In a preferred embodiment, the cavity 8 is not filled entirely by the housing material and should show at least a free space filled by air to further protect the chip when pressure and bending are applied to the housing.

The embedding of the RFID inlay 3 in the housing 1 may be achieved by applying an injection process to obtain the housing 1.

One possible embodiment for a method of manufacturing the flexible RFID tag for laundry comprises following steps:

The initial step of the manufacturing process is to create a RFID inlay 3. First, one has to arrange and fix on a flexible substrate layer 4 a RFID circuit comprising an antenna 7 connected to a chip 5. Then a second flexible layer 6 is used to cover the RFID circuit such that the substrate layer 4 and the second layer 6 form a protective inlay for the chip 5 and the antenna 7.

As already described above, the second layer 6 can be at this stage fixed to the substrate layer 4 by a plurality of fixation points in order to secure the integrity of the RFID inlay 3 for the rest of the manufacturing process. This may be achieved using for example one of gluing, using a pin and hole system, spot welding, grimping or any method used to insure that the injection material flow is able to push the layers down without shifting them. Alternatively the two layers could be fixed together to the housing 1 during injection, using one or more pins on the housing 1 side and corresponding one or more holes on the layers' side, in order to maintain the two layers together during injection.

In a preferred embodiment, these fixation points are selected on the circumference of the substrate layer 4 or respectively the second layer 6. Ideally, the fixation could be made continuous, such that the inlay 3 forms a sealed envelope containing the chip 5 and the antenna 7.

The second main step of the manufacturing process is to embed the RFID inlay 3 in the housing 1. In a preferred embodiment, this is achieved by injecting a thermoplastic elastomer (TE) around the inlay 3. Alternatively, the injected material to form the flexible housing 1 can be another type of plastic rubber, thermoplastic polyurethane or silicon for example.

More particularly, the housing 1 may be obtained by executing following steps through a process of injection:

forming a back side of the housing 1 by a first injection process of thermoplastic elastomer, stacking the RFID inlay 3 in/on the back side (possibly fixing the inlay 3 to the backside housing), and completing the housing 1 by a second injection of housing material over the back side housing and the inlay 3, whereby the inlay 3 is then fully embedded in the completed housing (1)

It is here of importance that the material of the layer 6 (resp. 4) has a softening point which is higher than the temperature of the embedding/injection process. This ensures that the said layer material will not melt and glue around the antenna 7 or the chip 5, creating the undesired mechanical links described above. This is also why TI is an appropriate choice for both layers 4 and 6.

In a preferred embodiment, the protection ring 2 is placed first in/on the back side of the housing, before the RFID inlay 3 is stacked on it. Thus, when the housing 1 is completed by the second injection step, no injected material is reaching the cavity 8 of the ring 2, which remains an empty air recess (with the advantages described above).

If injection is the preferred chosen process for creating the housing 1 (in particular due the high molecular cohesion of the resulting packaging which is well adapted to resist harsh environments). Other alternatives can be envisaged in the scope of the present invention.

For example, the housing can be made by lamination cover plastic layers forming a card format like tag. Of course the melting temperature of these cover layers should be chosen much lower than the one of the layers 4 and 6, such that lamination of the cover layers could be achieved without impacting the RFID inlay 3 (bonding layer 6 to antenna 7 or chip 5).

Alternatively the housing is made of dispensing process using flexible glue/potting to create the housing.

Although the invention has been shown and described with respect to certain preferred embodiments, it is obvious that equivalent alterations and modifications may be envisaged by others skilled in the art upon the reading and the understanding of this specification and the annexed drawings.

The invention claimed is:

1. A flexible Radio-Frequency IDentification (RFID) tag comprising:
   a flexible substrate layer on which is fixed an antenna connected to a RFID chip;
   a second flexible layer placed directly over the said chip and antenna but without any direct mechanical connection to them, such that the substrate layer and the second flexible layer are fixed together to form a protective inlay for the chip and the antenna; and
   wherein the said inlay is embedded in a flexible housing.

2. The flexible tag of claim 1, such that when the tag is bent or compressed, the chip and antenna can freely follow the deformation of the substrate layer without being submitted to mechanical stress due to differences of deformation of the second layer or of any other material forming the tag.

3. The flexible tag of claim 1, wherein the housing comprises a rigid protection ring having a cavity in its center, and which is oriented approximately in parallel to the inlay and positioned such that the chip inside of the inlay is situated at the vertical of the said cavity.

4. The flexible tag of claim 1, wherein the second flexible layer is fixed to the substrate layer at a plurality of points.

5. The flexible tag of claim 1, wherein the second flexible layer is fixed to the substrate layer on its entire circumference such that the inlay form a sealed envelope protecting the chip and the antenna.

6. The flexible tag of claim 1, wherein the substrate layer and the second flexible layer are made of polyimide.

7. The flexible tag of claim 1, wherein the housing is made out of one of thermoplastic elastomer, plastic rubber, thermoplastic polyurethane or silicon.

8. A method for manufacturing a flexible Radio-Frequency IDentification (RFID) tag such as described claim 1, comprising:
   arranging and fixing an antenna connected to a RFID chip on a flexible substrate layer;
   covering the said chip and said antenna with a second flexible layer such that the substrate layer and the second flexible layer are fixed together and form a protective inlay for the chip and the antenna; and embedding the inlay in a flexible housing.

9. The method of claim 8, whereby the step of embedding comprises:

forming a back side housing by a first injection of housing material;

stacking the inlay in the back side housing; and completing the housing by a second injection of housing material over the back side housing and the inlay, whereby the inlay is then fully embedded in the completed housing.

10. The method of claim 8, wherein a rigid ring is positioned in the back side housing previous to stacking the inlay.

11. The method of claim 8, further comprising fixing the second flexible layer to the substrate layer at a plurality of points before embedding the inlay in the flexible housing.

12. The method of claim 8, further comprising fixing the second flexible layer to the substrate layer on its entire circumference such that the inlay forms a sealed envelope protecting the chip and the antenna before embedding the inlay in the flexible housing.

13. The method of claim 8, wherein the substrate layer and the second flexible layer are of flexible material whose softening point is higher than the process temperature to embed the inlay in the housing, such than even after the embedding, the second layer is not directly mechanically attached to the antenna and the chip.

14. The method of claim 8, wherein the flexible housing is made of at least one of thermoplastic elastomer, plastic rubber, thermoplastic polyurethane or silicon.

15. The flexible tag of claim 1, wherein the flexible housing fully encloses the protective inlay, and the protective inlay fully encloses the chip and the antenna.

16. The method of claim 8, wherein the inlay forms an inner protective layer around the chip and the antenna and the housing forms an outer protective layer around the chip and the antenna.

\* \* \* \* \*